(12) United States Patent
Matayoshi et al.

(10) Patent No.: US 9,796,235 B2
(45) Date of Patent: Oct. 24, 2017

(54) SUSPENSION DEVICE FOR IN-WHEEL MOTOR DRIVEN WHEEL

(71) Applicant: Nissan Motor Co., Ltd., Yokohama-shi, Kanagawa (JP)

(72) Inventors: Yutaka Matayoshi, Yokosuka (JP); Tomoki Hirabayashi, Kamakura (JP); Sakiko Suzuki, Yokohama (JP); Jun Tamura, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 133 days.

(21) Appl. No.: 14/781,193

(22) PCT Filed: Mar. 31, 2014

(86) PCT No.: PCT/JP2014/059454
§ 371 (c)(1),
(2) Date: Sep. 29, 2015

(87) PCT Pub. No.: WO2014/178251
PCT Pub. Date: Nov. 6, 2014

(65) Prior Publication Data
US 2016/0052359 A1    Feb. 25, 2016

(30) Foreign Application Priority Data

Apr. 30, 2013  (JP) .................................. 2013-095797

(51) Int. Cl.
*G06K 1/00* (2006.01)
*B60G 15/06* (2006.01)
(Continued)

(52) U.S. Cl.
CPC ............. *B60G 15/067* (2013.01); *B60G 3/06* (2013.01); *B60G 3/20* (2013.01); *B60G 13/005* (2013.01);
(Continued)

(58) Field of Classification Search
CPC ............. B60L 2200/44; B60L 2200/46; B60K 7/0007; B60K 7/00; B62D 7/18;
(Continued)

(56) References Cited

U.S. PATENT DOCUMENTS 5,722,673 A * 3/1998 Mauz ...................... B60G 3/20
280/124.132
5,947,459 A * 9/1999 Ducloux .............. B60G 15/063
267/221

(Continued)

FOREIGN PATENT DOCUMENTS

JP          3-112724 A    5/1991
JP       2004-161157 A    6/2004
(Continued)

*Primary Examiner* — James M Dolak
(74) *Attorney, Agent, or Firm* — Global IP Counselors, LLP

(57) ABSTRACT

A suspension device for an in-wheel motor driven wheel is provided. An upper suspension arm is pivotally supported on the vehicle body for supporting the wheel in a vehicle upper position higher than an axle. A link member pivotally connects the wheel to the upper suspension arm and has an absorber connecting portion connected to a lower end of the shock absorber. The shock absorber connecting portion is disposed in the vehicle bottom position lower than an upper end portion of the in-wheel motor unit. The shock absorber is disposed between the vehicle body and the in-wheel motor unit and inclined so as to be closer to the vehicle body toward the lower end.

20 Claims, 9 Drawing Sheets

(51) Int. Cl.
  *B60G 3/20* (2006.01)
  *B60G 13/00* (2006.01)
  *B60K 7/00* (2006.01)
  *B60G 3/06* (2006.01)

(52) U.S. Cl.
  CPC .......... *B60G 15/062* (2013.01); *B60K 7/0007* (2013.01); *B60G 2200/142* (2013.01); *B60G 2200/144* (2013.01); *B60G 2200/18* (2013.01); *B60G 2200/422* (2013.01); *B60G 2202/312* (2013.01); *B60G 2204/129* (2013.01); *B60G 2204/1484* (2013.01); *B60G 2204/182* (2013.01); *B60G 2204/30* (2013.01); *B60G 2204/422* (2013.01); *B60G 2300/50* (2013.01)

(58) Field of Classification Search
  CPC ........ B62D 7/00; B60G 15/062; B60G 15/02; B60G 15/06; B60G 15/00; B60G 15/067; B60G 3/20; B60G 3/00; B60G 3/06; B60G 13/005
  See application file for complete search history.

(56) References Cited

U.S. PATENT DOCUMENTS

| | | | | |
|---|---|---|---|---|
| 6,386,553 | B2 * | 5/2002 | Zetterstrom | B60K 7/0007 180/65.51 |
| 6,585,276 | B2 * | 7/2003 | Boucquey | B60G 3/20 280/124.135 |
| 7,118,119 | B2 * | 10/2006 | Amanuma | B60G 3/20 180/65.51 |
| 7,216,731 | B2 * | 5/2007 | Kakinami | B60K 7/00 180/65.1 |
| 7,413,203 | B2 * | 8/2008 | Kurata | B60K 7/0007 180/65.51 |
| 7,537,071 | B2 * | 5/2009 | Kamiya | B60G 3/20 180/298 |
| 7,537,223 | B2 * | 5/2009 | Zetterstroem | B60G 3/265 280/5.52 |
| 7,735,588 | B2 * | 6/2010 | Murata | B60G 3/20 180/65.51 |
| 7,963,538 | B2 * | 6/2011 | Roland | B60G 3/26 280/124.138 |
| 8,453,774 | B2 * | 6/2013 | Nagaya | B60G 3/01 180/65.51 |
| 8,863,874 | B2 * | 10/2014 | Lee | B60K 7/0007 180/65.51 |
| 8,936,265 | B2 * | 1/2015 | Ehrlich | B60G 3/00 267/246 |
| 9,358,852 | B2 * | 6/2016 | Zuge | B60G 3/14 |
| 9,637,172 | B2 * | 5/2017 | Sagara | B62D 21/155 |
| 9,649,923 | B2 * | 5/2017 | Perlo | B60K 1/02 |
| 9,676,240 | B2 * | 6/2017 | Hinz | B60G 3/06 |
| 2009/0133944 | A1 * | 5/2009 | Nishioka | B60G 3/20 180/65.51 |

FOREIGN PATENT DOCUMENTS

| | | |
|---|---|---|
| JP | 2005-132174 A | 5/2005 |
| JP | 2008-155696 A | 7/2008 |
| JP | 2008-168804 A | 7/2008 |
| JP | 2008-179277 A | 8/2008 |
| JP | 2010-228544 A | 10/2010 |
| JP | 2013-144509 A | 7/2013 |

* cited by examiner

SUSPENSION DEVICE FOR IN-WHEEL MOTOR DRIVEN WHEEL

CROSS-REFERENCE TO RELATED APPLICATIONS

This application is a U.S. National stage application of International Application No. PCT/JP2014/059454, filed Mar. 31, 2014, which claims priority based on Japanese Patent Application No. 2013-095797, filed in Japan Patent Office on Apr. 30, 2013, the contents of each of which is hereby incorporated herein by reference.

BACKGROUND

Field of the Invention

The present invention relates to a suspension device for an in-wheel motor driven wheel, in which a wheel driven by an in-wheel motor is suspended on a vehicle body through a suspension structure member and a shock absorber.

Background Information

Conventionally, a suspension device for an in-wheel motor driven wheel is known, in which a motor case of an in-wheel motor unit disposed in the wheel inside is inclined to a vehicle body at an upper portion thereof so as to be closer to the vehicle body, and an lower end of a shock absorber is connected to an orthogonal portion that is formed by an upper surface of the motor case and a vehicle body side surface (for example, see JP 2008-155696 A).

SUMMARY

However, in the conventional suspension device for an in-wheel motor driven wheel, since the shock absorber is connected to the motor case of the in-wheel motor unit, a reaction force of a load exerted on a tire during the vehicle travelling is directly input to the motor case via the shock absorber connected to the vehicle body and the motor case. Disadvantageously, the motor case must be rigidly structured so as to withstand the reaction force.

Further, in the suspension device for the conventional in-wheel motor driven wheel, since the lower end of the shock absorber is connected to the orthogonal portion which is formed by the upper surface and the vehicle body side surface of the motor case, the lower end of the shock absorber will be disposed in the upper part of the vehicle. Thus, when maintaining the overall length of the shock absorber, the upper end of the shock absorber will protrude upwardly of the vehicle. On the other hand, when shortening the overall length of the shock absorber to suppress the projection in the vehicle upper side, the problem of insufficient stroke occurs. Note that the lower end of the shock absorber could be arranged in the lower position than the upper surface of the motor case by allowing the lower end of the shock absorber to be connected to the vehicle body side surface of the motor case. In this case, however, the shock absorber is arranged between the vehicle body side surface and the vehicle body, which would pose restriction on a space between the motor case and the vehicle body. Therefore, it may be difficult to ensure the length of the in-wheel motor unit in the axle direction.

The present invention has been created in view of the problem described above, and aims to provide a suspension device for an in-wheel motor driven wheel, which can secure a length in the axle direction of the in-wheel motor unit without setting an upper end of the shock absorber at a high position.

In order to achieve the above object, in a suspension device for an in-wheel motor driven wheel according to the present invention, the wheel which is driven by the in-wheel motor unit is suspended on a vehicle body by a shock absorber and a suspension structure member which is provided with an upper suspension arm and a link member. The upper suspension arm is swivelly or pivotally supported by the vehicle body, and supports the wheel in a vehicle upper position higher than an axle. The link member is configured to pivotally connect the wheel to the upper suspension arm, and comprises a shock absorber connecting portion to be connected to the lower end of the shock absorber. In addition, the shock absorber connecting portion is disposed in the vehicle bottom position lower than the upper end of the in-wheel motor unit. Further, the shock absorber is disposed between the vehicle body and the in-wheel motor unit and is inclined to be closer to the vehicle body toward the lower end thereof.

According to the present invention, the shock absorber connecting portion at which the lower end of the shock absorber is connected to the link member is disposed in the vehicle bottom position lower than the upper end portion of the in-wheel motor unit. Thus, without elevating the upper end position of the shock absorber, it is possible to increase the overall length of the shock absorber to thereby secure the necessary stroke. Further, the shock absorber is inclined to be closer to the vehicle body toward the lower end thereof and is arranged between the vehicle body and the in-wheel motor unit. In other words, the shock absorber approaches the vehicle body while being separated from the wheel at its lower end that overlaps with the in-wheel motor unit in the vehicle vertical direction. Consequently, without setting the upper end of the shock absorber at a higher position, it is possible to secure the length of the in-wheel motor unit in the axle direction.

BRIEF DESCRIPTION OF THE DRAWINGS

Referring now to the attached drawings which form a part of this original disclosure.

DETAILED DESCRIPTION OF THE EMBODIMENTS

Below, a description is given of embodiments for implementing a suspension device for an in-wheel motor driven wheel according to the present invention based on a first to seventh embodiments with reference to accompanying drawings.

First Embodiment

Figure 1:
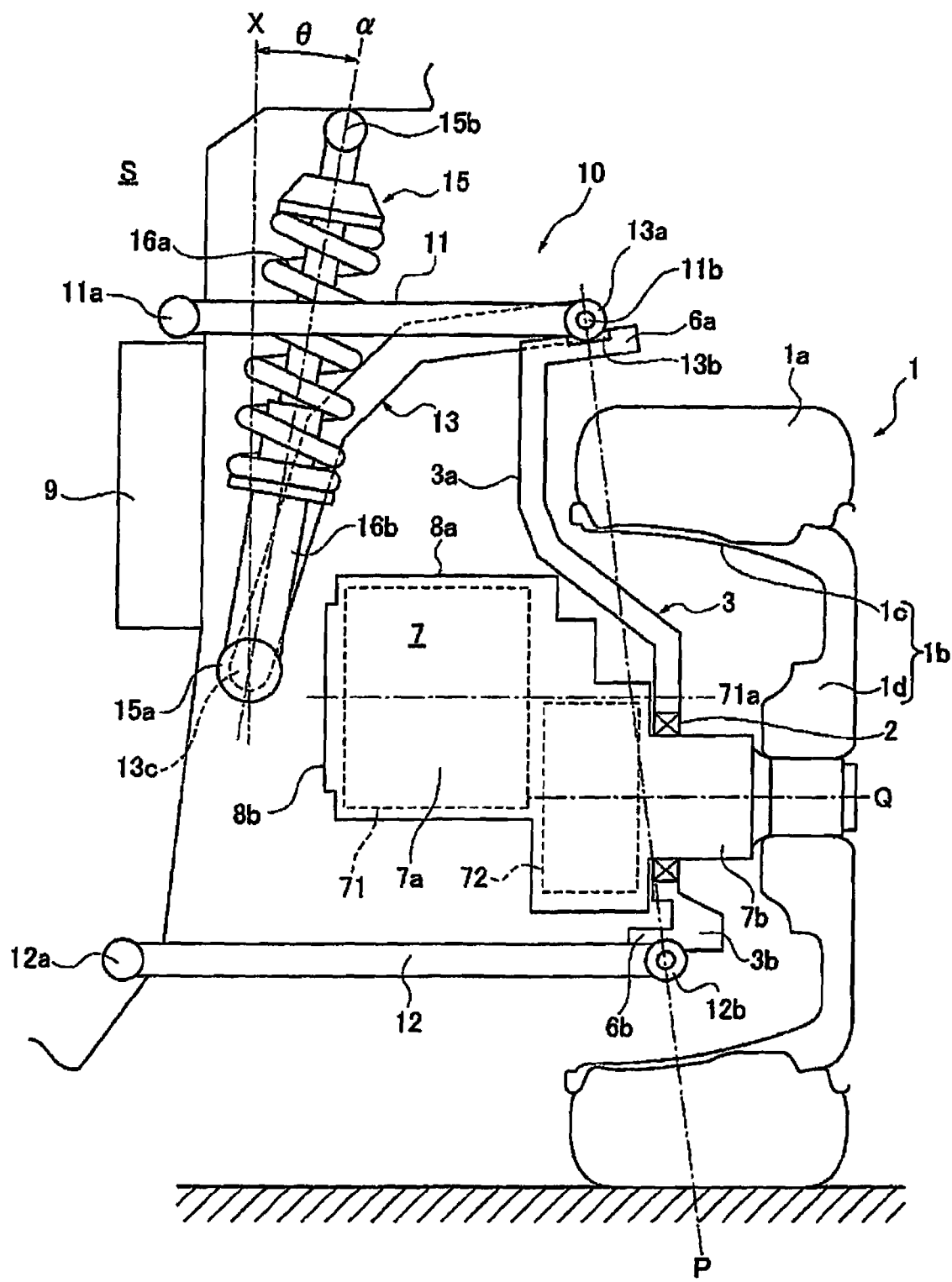
FIG. 1 is a front view of an in-wheel motor driven wheel, when viewed from the front of the vehicle, to which a suspension device of a first embodiment is applied.

First, a configuration is described. A description is given of the configuration of a suspension device mounted on an in-wheel motor driven wheel (suspension device for in-wheel motor driven wheel) in the first embodiment in the "overall configuration", "configuration of a suspension structure member", and "configuration of a shock absorber", separately.
Overall Configuration FIG. 1 is a front view of an in-wheel motor driven wheel, when viewed from the front of the vehicle, to which a suspension device of a first embodiment is applied. Note that FIG. 1 illustrates a straight traveling state where the wheels are not steered. Below, referring to FIG. 1, the overall configuration or structure of a suspension device of the first embodiment is described.

A wheel 1 arranged in the front-right side of the vehicle body S shows a front steered wheel provided with a tire 1a and a wheel portion 1b on the outer periphery of which the tire 1a is mounted. The wheel portion 1b is provided with a rim 1c to support the tire 1a and a disk-shaped wheel disc 1d positioned in the center of the rim 1c. The wheel 1 is connected to an output shaft 7b of the in-wheel motor unit 7 through a hub bolt (not shown) which is attached to the wheel disc 1d and is rotatable about the axle Q.

The in-wheel motor unit 7 includes a unit case (motor case) 7a, an electric motor 71 incorporated in the unit case 7a (rotary electric machine) and a speed reduction gear unit 72 (transmission). The unit case 7a forms a casing and, at an upper end surface 8a (upper end portion) thereof, extends in a horizontal direction while a vehicle body-side end surface 8b extends in the vertical direction. Here, the "upper end surface 8a" is a top surface facing the vehicle upper side and located in the highest position on the vehicle upper side. Also, the "body-side end face 8b" is a side surface of the unit case 7a, which is exposed to the vehicle body S, and is a portion that is closest to the vehicle body S.

The motor output shaft 71a of the electric motor 71 is offset in the vehicle upward direction parallel to the output shaft 7b of the in-wheel motor unit 7 which is a reduction gear output shaft, so that the motor output shaft 71a is located upwardly of the vehicle with respect to the output shaft 7b. Not that the output shaft 7b of the in-wheel motor unit 7 is disposed coaxially with the axle Q of the wheel 1. For this reason, the motor output shaft 71a of the electric motor 71 is offset parallel to the axle Q of the wheel 1.

Further, to the output shaft 7b of the in-wheel motor unit 7, a knuckle 3 is attached via a hub bearing 2. Further, the knuckle 3 has an upper bracket 3a which extends upwardly of the vehicle, a lower bracket 3b extending in the vehicle downward, and a steering bracket which extends from the top to the front of the vehicle (not shown). The upper bracket 3a is formed at its tip portion with a kingpin rotating portion 6a, and the kingpin rotating portion 6a in turn is supported on a suspension structure member 10 rotatably in the steering direction. The lower bracket 3b is supported by the suspension structure member 10 rotatably in the steering direction. Further, to the steering bracket (not shown), the tip portion of a tie rod is attached, which extends from a rack and pinion unit operable by a steering wheel (not shown). Thus, when the driver rotates the steering wheel, the knuckle rotates about a kingpin axis P extending between the kingpin rotating portion 6a and the lower arm supporting portion 6b to thereby steer the wheel 1.

Further, the wheel 1 is suspended on the vehicle body S so as to stroke in the vehicle vertical direction via the suspension structure member 10 that positions the wheel and the shock absorber 15 that expands and contracts in response to vertical movement of the wheel 1. Note that a side member 9 is provided to support the vehicle body S and extends in the vehicle longitudinal direction.
Configuration of Suspension Structure Member The suspension structure member 10 includes, as shown in FIG. 1, an upper suspension arm 11, a lower suspension arm 12 and a third link 13 (link member).

The upper suspension arm 11 is disposed in the vehicle upper position higher than the axle Q, which is swingably or pivotally supported at a vehicle body side end portion 11a in the vertical and longitudinal directions relative to the vehicle body S. Moreover, the upper suspension arm 11 extends laterally toward the wheel 1, and at a wheel-side end portion 11b, a third link 13 is connected swingably in the vehicle vertical direction.

The lower suspension arm 12 is disposed in a lower position on the vehicle than the axle Q, which is pivotally or swingably supported by the vehicle body side end portion 12a in the vertical and longitudinal directions relative to the vehicle body S. Further, the lower suspension arm 13 extends laterally toward the wheel 1, and at the wheel-side end portion 12b, the lower arm supporting portion 6b of the knuckle 3 is connected so as to be rotatable in the steering direction (about the kingpin axis P) and pivotal or swingable in the vehicle vertical direction.

As shown in FIG. 1, the third link 13 operates as a link member to connect the wheel 1 and the upper suspension arm 11 while connecting the wheel 1 and the shock absorber 15. Further, as shown in FIG. 1, the third link 13 is provided with an arm connecting portion 13a, a wheel supporting portion 13b, and a shock absorber connecting portion 13c.

The arm connecting portion 13a is formed in the upper position of the third link 13 and the upper suspension arm 11 is connected. Note that, in the first embodiment, the arm connecting portion 13a is disposed in the vehicle upper position higher than the tire 1a of the wheel 1 while protruding in the lateral outside to protrude upwardly of the tire 1a.

The wheel supporting portion 13b is formed in the upper portion of the third link 13 and is disposed in a position below the arm connecting portion 13a. A kingpin rotating portion 6a formed in an upper bracket 3a of the knuckle 3 is connected to the wheel supporting portion 13b rotatably in the steering direction (about the kingpin axis P).

The shock absorber connecting portion 13c is formed in the lower portion of the third link 13 and connected to the shock absorber 15 by inserting a bolt (not shown) in a state of being sandwiched by a pair of attachment plates formed in the lower end 15a of the shock absorber 15. In other words, the shock absorber connecting portion 13c is swivel or pivotally connected in the vertical direction with respect to the lower portion 15a of the shock absorber 15. Further, as shown in FIG. 1, the shock absorber connecting portion 13a is disposed below the upper end surface 8a of the in-wheel motor unit 7.

Configuration of Shock Absorber

As shown in FIG. 1, the shock absorber 15 includes a coil spring 16a and a damper 16b, and the upper portion 15b is fixed to the vehicle body S. Note that the shock absorber 15 is a so-called coil over type in which the damper 16b is coaxially disposed inside the coil spring 16 for an integral structure.

The coil spring 16a represents a portion for absorbing an impact while supporting the vehicle weight, including spiral wound spring.

The damper 16b is a portion that attenuates the deformation of the coil spring 16a, and has a cylinder and a piston rod extendable from or retractable in the cylinder. In addition, the tip of the piston rod coincides with the lower end 15a of the shock absorber 15, and is connected to the shock absorber connecting portion 13c after projecting downward from the coil spring 16a. Further, the shock absorber 15 is disposed at least at a lower end 15a thereof between the vehicle body S and the body-side end surface 8b of the in-wheel motor unit 7.

Furthermore, when viewed from the vehicle front, the shock absorber 15 is inclined to the vehicle body S so as to be positioned closer toward the lower end 15a. In other words, the lower end 15a of the shock absorber 15, which is connected to the shock absorber connecting portion 13, overlaps with the in-wheel motor unit 7 in the vehicle vertical direction since the shock absorber connecting portion 13c is arranged in the vehicle bottom position lower than the upper end surface 8a on the in-wheel motor unit 7. Here, when the shock absorber 15 is inclined to the vehicle body so as to come closer toward the lower end 15a, the shock absorber 15 is inclined such that the bottom end 15a is separated from the vehicle body-side end surface 8b. Note that the inclination angle (difference between the vertical direction X and the axial direction α of the shock absorber) θ is set to such an angle at which the lower end 15a of the shock absorber 15 does not interfere with the vehicle body S, and the lower end 15a comes closest to the vehicle body S without the damper 16b interfering with the in-wheel motor unit 7.

Now, a description is given of the operation of the suspension device for an in-wheel motor driven wheel in the first embodiment in the "shock absorber layout", "motor mounting space increase operation", and "wheel input load supporting operation", separately.

Shock Absorber Layout

In the suspension device of the first embodiment, as shown in FIG. 1, the shock absorber connecting portion 13c of the third link 13 is disposed in the vehicle bottom position lower than the upper end surface 8a of the in-wheel motor unit 7. In other words, the lower end 15a of the shock absorber 15 connected to the shock absorber connecting portion 13c overlaps with the in-wheel motor unit 7 in the vehicle vertical direction.

Thus, it is possible to set the lower end 15a of the shock absorber 15 at a relatively lower position (i.e. position near the road surface) while avoiding the conflict between the shock absorber 15 and the in-wheel motor unit 7. Therefore, without setting the upper position that corresponds to the vehicle mounting position of the shock absorber 15 at a high position, the overall length of the shock absorber 15 may be set at an appropriate length that ensures a necessary stroke.

Furthermore, in the suspension device of the first embodiment, since there is no need to set the upper end 15b of the shock absorber 15 to the high position, a strut housing formed in the vehicle body S (not shown) would not protrude upwardly. Therefore, it is not necessary to increase the height of the hood (not shown) covering the strut housing.

Moreover, it is not necessary to rigidly form the unit case 7a while achieving motor weight reduction as well as compactness.

Motor Mounting Space Increasing Operation

In the suspension device of the first embodiment, the lower end 15a of the shock absorber 15 is disposed between a vehicle body-side end surface 8b and the vehicle body S. Further, the shock absorber 15, when viewed from the vehicle front, is inclined to the vehicle body so as to be closer to the vehicle body toward the lower end 15a.

Figure 2:
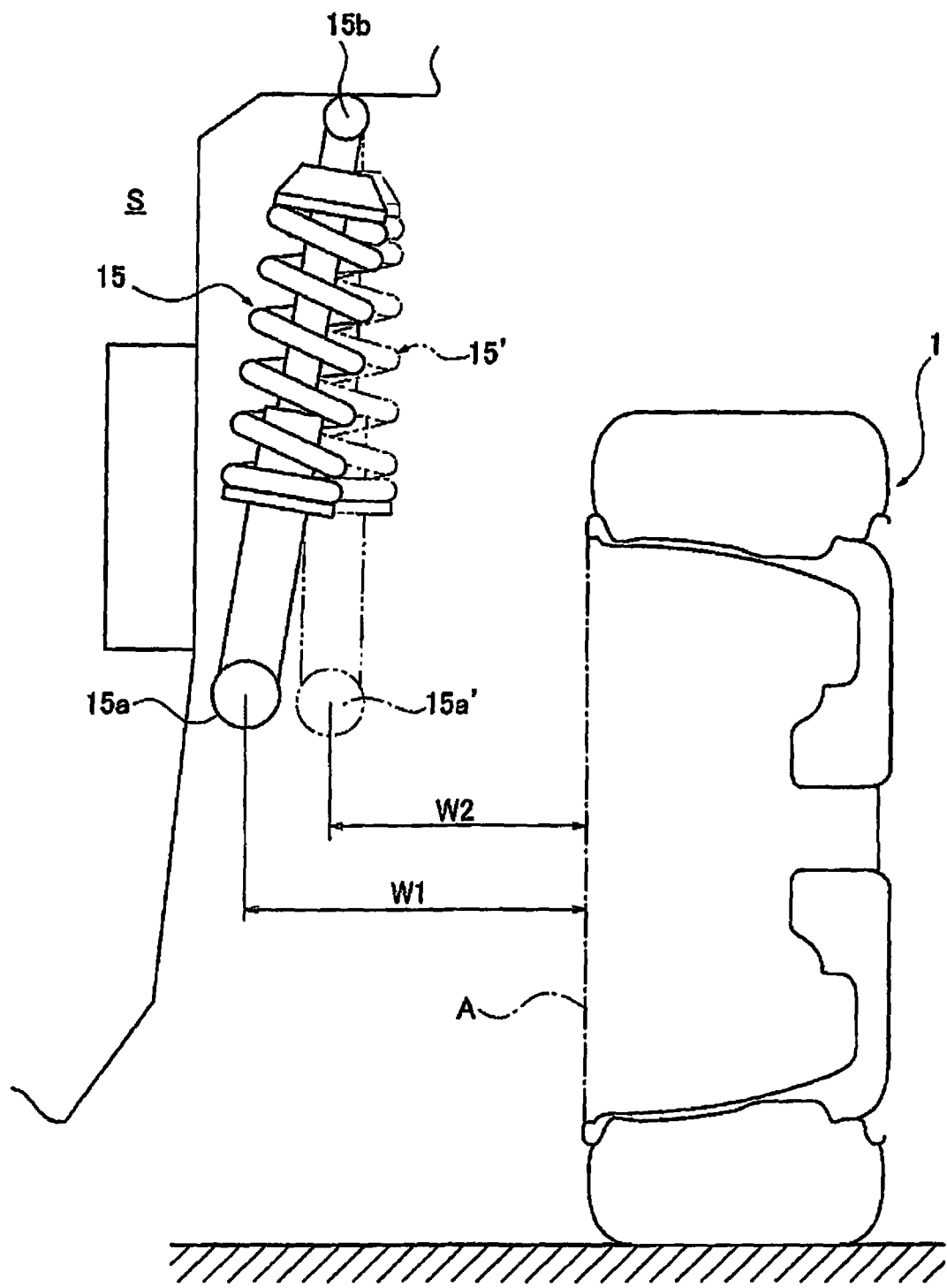
FIG. 2 is an explanatory view showing a distance between the shock absorber lower end and the wheel in the first embodiment as well as a distance between the shock absorber lower end and the wheel in Comparative Example.

Therefore, as shown in FIG. 2, for example, when compared to a shock absorber 15' in the Comparative Example (shown in a dot line in FIG. 2), which extends vertically with its top end 15b being disposed in the same state as the first embodiment, in the shock absorber 15 in the first embodiment (shown in a solid line in FIG. 2), the lower end 15a may be separated from the wheel 1. In other words, a distance W1 between a vehicle body side open surface of the wheel disk 1d (shown in a dashed line A in FIG. 2) and the lower end 15a of the shock absorber 15 is longer than a distance W2 between the vehicle body side open surface (dashed line A) of the wheel disk 1d and the lower end 15a' of the shock absorber 15'. Thus, the arrangement space of the in-wheel motor unit 7, which is arranged between the wheel 1 and the shock absorber 15, may be made wider in the axle direction in the first embodiment so that the axle direction length of the in-wheel motor unit 7 can be ensured.

Moreover, by bringing the shock absorber 15 closer to the vehicle body S toward the lower end, it is possible to transmit nearly 100% of the pressing amount of the shock absorber 15 relative to the wheel 1. That is, by allowing an inclination angle θ to the shock absorber 15, the shock absorber 15 extends in a state in which the upper end 15b is tilted or inclined to the side of the wheel 1. Therefore, when the wheel 1 is steered or undergoes vertical movements (bound and rebound) and the like, against the load to be input from the wheel 1, the pressing force or reactive force operates to cancel the input load. Consequently, it is possible to effectively reduce the rebound of the wheel 1.

Wheel Input Load Supporting Operation

In the suspension device of the first embodiment, with respect to the wheel 1, the upper suspension arm 11 and the shock absorber 15 are connected via the third link 13. Further, the third link 13 is supported at a wheel supporting portion 13b on the upper side bracket 3a of the knuckle 3. At this time, the wheel supporting portion 13b is point supported on the kingpin rotating portion 6a so that the third link 13 and the knuckle 3 are relatively rotatable about the kingpin axis P.

Therefore, when the wheel 1 moves up and down, the whole of the third link 13 moves up and down following this vertical movement. That is, the load in the vehicle vertical direction that acts on the wheel 1 is input to the wheel supporting portion 13b of the third link 13 via the kingpin rotating portion 6a of the knuckle 3. Here, the wheel supporting portion 13b is rotatable about the kingpin axis P on the one hand. However, since the wheel supporting portion 13b is restricted in the vehicle vertical direction, due to the load input from the wheel supporting portion 13b in the vehicle vertical direction, the entirety of the third link 13 will move vertically.

Thus, regardless of the setting position of the arm connecting portion 13a and shock absorber coupling portion 13c, the load in the vehicle vertical direction input from the wheel 1, the force acting from a third link 13 to the upper suspension arm 11, and the force acting from the third link 13 to the shock absorber 15 can be set to the same extent.

Consequently, in order to secure a space for arranging the in-wheel motor unit 7 between the shock absorber 15 and the wheel 1, even when the lower end 15a of the shock absorber 15 is placed in the vicinity of the vehicle body S away from the wheel 1, the lever ratio may be set to approximately 1. Here, the "lever ratio" is a ratio of the vertical stroke of the coil spring 16a of the shock absorber 15 to the vertical stroke of the wheel 1. Thus, the lever ratio of the shock absorber 15 may be prevented from being worsened.

Now, a description of technical effects is set forth. In the suspension device for an in-wheel motor driven wheel in the first embodiment, the following effects may be achieved.

(1) A suspension device for an in-wheel motor driven wheel in which a wheel driven by an in-wheel motor unit 7 is suspended on a vehicle body S by a suspension structure member 10 and a shock absorber 15, the suspension structure member comprising an upper suspension arm 11 that is pivotally supported on the vehicle body S for supporting the wheel 1 in a vehicle upper position higher than an axle Q, and a link member (third link 13) that pivotally connects the wheel 1 to the upper suspension arm 11 and has a shock absorber connecting portion 13c that is connected to a lower end 15a of the shock absorber 15, wherein the shock absorber connecting portion 13c is disposed in the vehicle lower or bottom position lower than an upper end portion (upper end surface 8a) of the in-wheel motor unit 7, and wherein the shock absorber is disposed between the vehicle body S and the in-wheel motor unit and inclined so as to be closer to the vehicle body S toward the lower end 15a. Thus, without setting the upper end 15b of the shock absorber 15 to a higher position, it is possible to secure a length in the axle direction of the in-wheel motor unit 7.

Second Embodiment

In a second embodiment, the angle of the in-wheel motor unit relative to the shock absorber is configured differently from the first embodiment.

Figure 3:
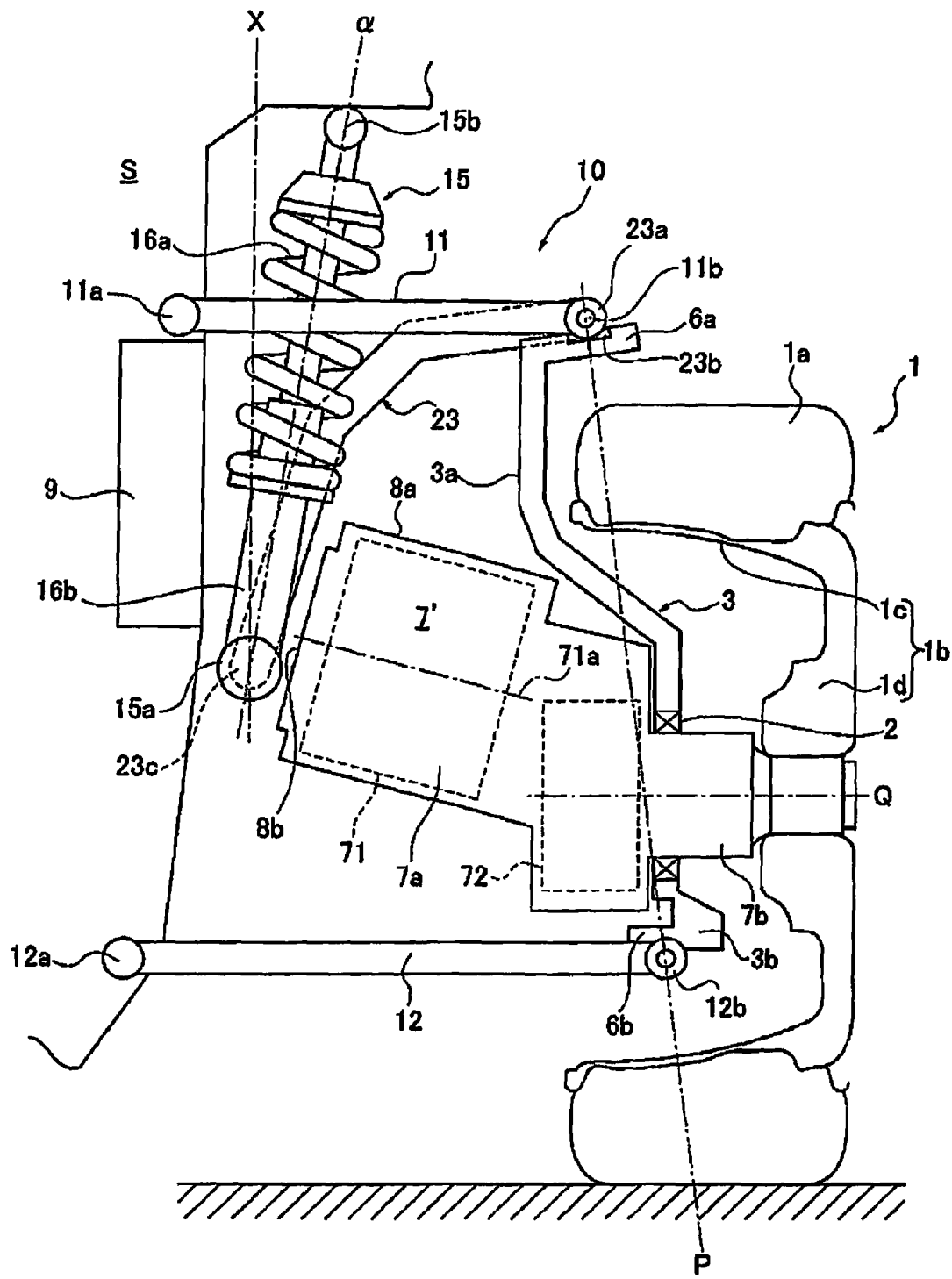
FIG. 3 is a front view of an in-wheel motor driven wheel, when viewed from the front of the vehicle, to which a suspension device of a second embodiment is applied.

FIG. 3 is a front view of an in-wheel motor driven wheel, when viewed from the front of the vehicle, to which a suspension device of a second embodiment is applied. Note that FIG. 3 shows a straight traveling state in which wheels are not steered. Also, the same structure as in the first embodiment is attached with the same reference numeral, and a detailed description thereof will be omitted.

In the suspension device in the second embodiment, as shown in FIG. 3, the in-wheel motor unit 7' has an electric motor 71 (rotating electrical machine) and a reduction gear 72 (transmission) accommodated in a unit case 7a. Further, a motor output shaft 71a of the electric motor 71 is inclined with respect to an output shaft 7b of the in-wheel motor unit 7' representing an output shaft of the reduction gear. Here, since the output shaft 7b of the in-wheel motor unit 7' is disposed coaxially with the axle Q of the wheel 1, the motor output shaft 71a of the electric motor 71 is connected to the axle Q of the wheel 1 in an inclined state. Note that, as shown in FIG. 3, that the electric motor 71 is disposed in a upper position of the axle Q, and the motor output shaft 71a is inclined so as to face downward at the side of the wheel 1.

Further, in the second embodiment, the vehicle body-side end surface 8b of the unit case 7a accommodating the electric motor 1 and the reduction gear 72 is inclined so as to be parallel to the shock absorber axis a, which in turn is inclined relative to the vertical direction X, At this instance, the motor output shaft 71a of the electric motor 71 extends in a direction perpendicular to the shock absorber axis a.

Furthermore, in the suspension device of the second embodiment as well, in the same manner as in the first embodiment, the wheel 1 is connected to the upper suspension arm 11 and the shock absorber 15 via the third link 23 (link member). Further, the third link 23 has an arm connecting portion 23a, a wheel supporting portion 23b, and a shock absorber connecting portion 23c. In addition, as shown in FIG. 3, the shock absorber connecting portion 23c is disposed in the vehicle lower position of the upper end surface 8a of the in-wheel motor unit 7.

Further, the lower end 15a of the shock absorber 15 is arranged between the vehicle body S and the vehicle body-side end surface 8b of the in-wheel motor unit 7', while being inclined so as to closer to the vehicle body S toward the lower end 15a, when viewed from the vehicle front, By inclining the vehicle body-side end surface 8b of the unit case 7a so as to be parallel to the shock absorber axis α, when comparing to the case of the first embodiment in which the vehicle body-side end surface 8b of the unit case 7a of the in-wheel motor unit 7 extends vertically, it is possible to position the vehicle body side end surface 8b of the unit case 7a closer to the shock absorber 15 in the second embodiment. In other words, when the vehicle body-side end surface 8b of the unit case 7a is inclined, the gap between the vehicle body-side end surface 8b and the shock absorber 15 may be set narrower. Consequently, in the second embodiment, the unit case 7a of the in-wheel motor unit 7' may expand in the axle direction. Further, the length of the in-wheel motor unit 7' in the axle direction may be secured to be long.

Now, a description of the effects is given. In the suspension device for an in-wheel motor driven wheel in the second embodiments, the following effects may be achieved.

(2) The in-wheel motor unit 7' has an rotating electrical machine (electric motor 71) and the output shaft (motor output shaft 71a) of the rotating electrical machine 71 is inclined with respect to the axle Q of the wheel 1. Further, the vehicle body-side end surface 8b of the in-wheel motor unit 7' is inclined so as to be parallel to the axial direction α of the shock absorber 15. Thus, the vehicle body-side end surface 8b of the in-wheel motor unit 7' can be brought close to the shock absorber 15. Further, it is possible to secure the length of the in-wheel motor unit 7' in the axle direction.

Third Embodiment

In a third embodiment, the shock absorber is configured differently from the first and second embodiments.

Figure 4:
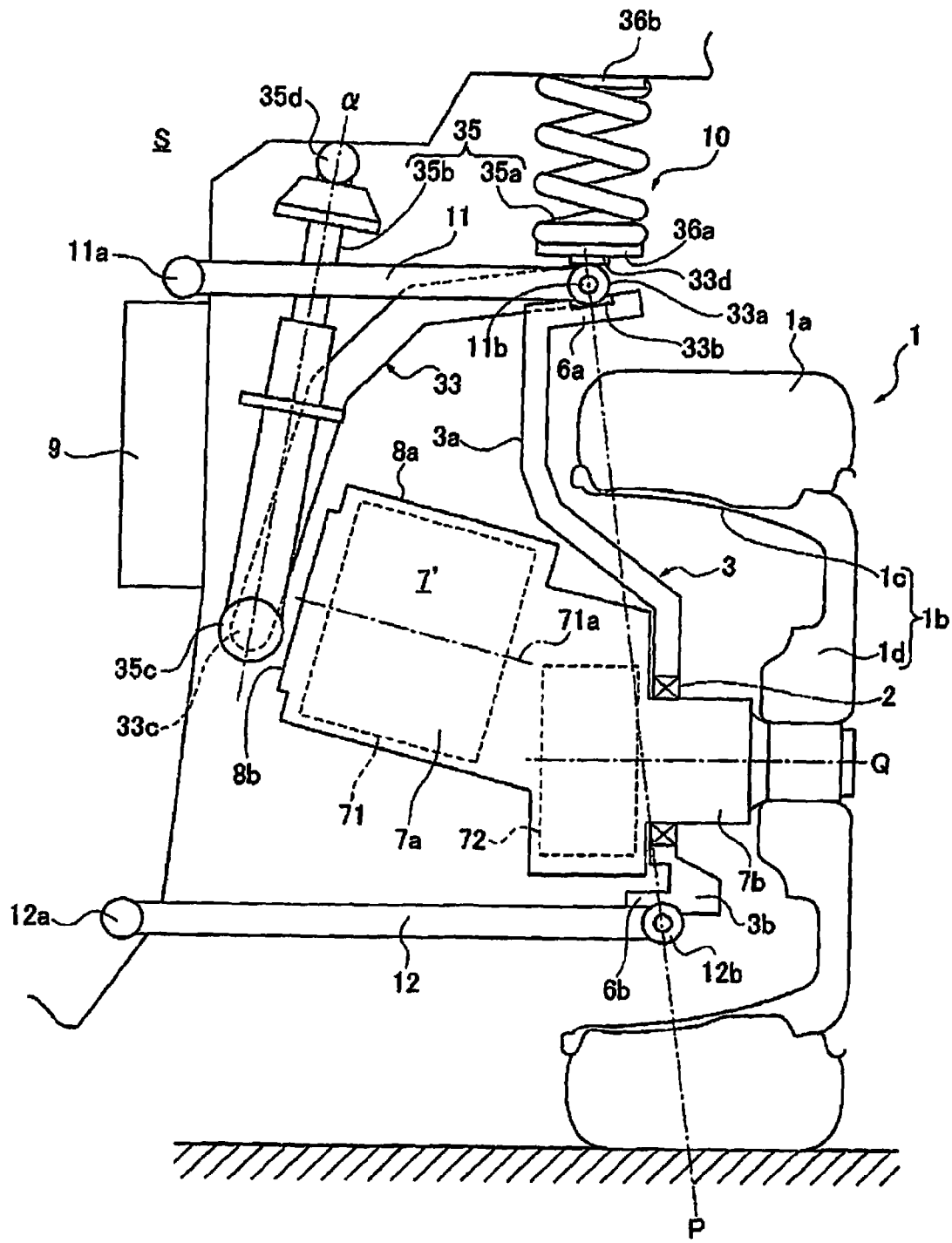
FIG. 4 is a front view of an in-wheel motor driven wheel, when viewed from the front of the vehicle, to which a suspension device of a third embodiment is applied.

FIG. 4 is a front view of an in-wheel motor driven wheel, when viewed from the front of the vehicle, to which a suspension device of a third embodiment is applied. Incidentally, FIG. 4 shows a straight traveling state where the wheels are not steered. Also, the same structure as in the first and second embodiments, the same reference numeral is attached and detailed description thereof will be omitted.

In the suspension device in the third embodiment, as well, the in-wheel motor unit 7' has an electric motor 71 (rotating electrical machine) and a reduction gear 72 (transmission) accommodated in a unit case 7a. Further, a motor output shaft 71a of the electric motor 71 is connected to the axle Q of the wheel 1 in an inclined state. The vehicle body-side end surface 8b of the unit case 7a is inclined so as to be parallel to the axis direction α of the shock absorber.

Also in the suspension device of the third embodiment, as well, similarly to the first and second embodiments, the wheel 1 is connected to the upper suspension arm 11 and the shock absorber 15 via the third link 33 (link member). Further, the third link 33 has an arm connecting portion 33a, a wheel supporting portion 33b, a shock absorber connecting portion 33c, and a spring connecting portion 33d. In addition, the shock absorber connecting portion 33c is disposed in the vehicle lower position of the upper end surface 8a of the in-wheel motor unit 7. The spring connecting portion 33d is formed in the upper position of the third link 33 and is disposed in the vehicle upper position of the arm connecting portion 33a.

On the other hand, in the third embodiment, the damper 35b of the shock absorber 35 is disposed outside of the coil spring 35a. In other words, in the shock absorber 35 in the third embodiment, the coils spring 35a and the damper 35b are separate from each other and individually disposed between the vehicle body S and the third link 33.

The coil spring portion 35a is connected at the lower end 36a to the spring connecting portion 33d of the third link 33 while being fixed to the vehicle body S at the upper end 36b. Note that the coil spring 35a, when viewed from the vehicle front, extends in the vertical direction.

On the other hand, the damper 35b is connected at its lower end 35c to the shock absorber connecting portion 33c of the third link 33, while, at its upper end, being connected to the vehicle body S at a position closer to the vehicle body S than the coil spring 35a in the lateral direction. Further, the lower end 35c of the damper 35b is disposed between the vehicle body S and the vehicle body-side end surface 8b of the in-wheel motor unit 7'. In addition, the damper 35b is inclined so as to come closer to the vehicle body S toward the lower end 35c, when viewed from the vehicle front.

Moreover, by separating the coil spring 35a and the damper 35b of the shock absorber 35 from each other, and by placing the coil spring 35a in a position different from the damper 35b and between the vehicle body S and the third link 33, between the vehicle body S and the in-wheel motor unit 7', the radial dimension of the axial direction α of the shock absorber 35 is made smaller than the first embodiment. More specifically, for example as in the first embodiment, in the case of arranging the damper 16b on the inner side of the coil spring 16a, the radial dimension about an axial direction α of the shock absorber 15 between the body S and the in-wheel motor unit 7' is determined by the outside diameter of the coil spring 16a. In contrast, as in the third embodiment, when coil spring 35a and the damper 35b are separated from each other, the diameter of the shock absorber 35 about an axial direction α of the shock absorber 35 between the vehicle body S and the in-wheel motor unit 7' is determined by the outer diameter of the damper 35b of relatively small diameter.

Thus, it is possible to place the damper 35b of the shock absorber 35 closer to the vehicle body S than in the first embodiment so as to reduce the clearance between the shock absorber 35 and the vehicle body S. As a result, the in-wheel motor unit 7' may be expanded in the lateral direction broader in the third embodiment than in the first embodiment. Further, it is possible to secure a longer length in the axle direction of the in-wheel motor unit 7'.

Now, a description of the effects is given. In the suspension device for the in-wheel motor driven wheel in the third embodiment, the following effect may be achieved.

(3) The shock absorber 35 includes a damper 35b and a coil spring 35a, wherein the damper 35b is placed outside of the coil spring 35a and between the vehicle body S and the shock absorber connecting portion 33c, wherein the coil spring 35a is placed between the vehicle body S and the link member (third link 33). Thus, it is possible to place the damper 35b of the shock absorber 35 more closer to the vehicle body S so as to expand in the axle direction. Further, it is possible to secure a longer length of the in-wheel motor unit 7 in the axle direction.

Fourth Embodiment

In a fourth embodiment, the shock absorber is configured differently from the first to third embodiments.

Figure 5:
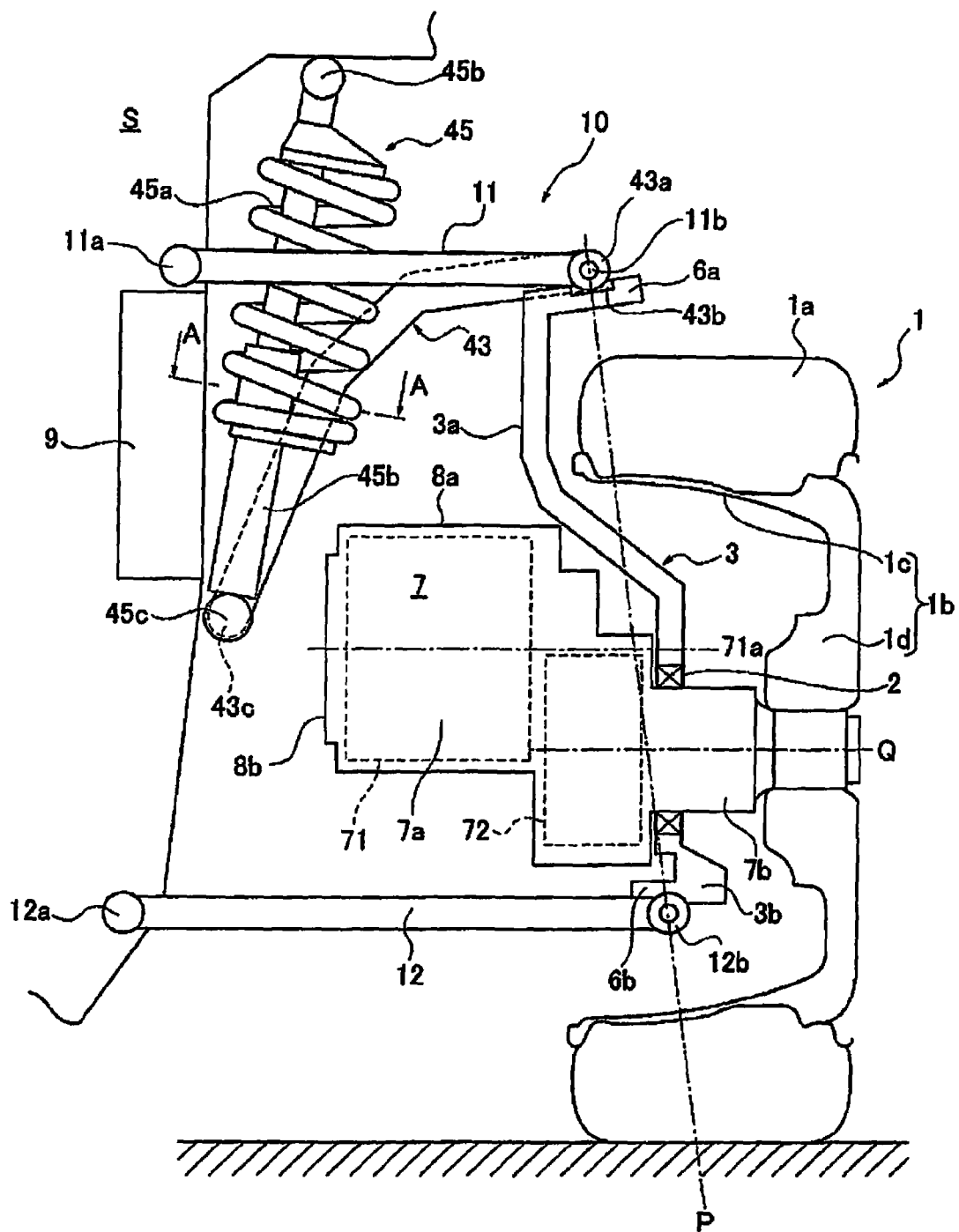
FIG. 5 is a front view of an in-wheel motor driven wheel, when viewed from the front of the vehicle, to which a suspension device of a fourth embodiment is applied.
Figure 6:
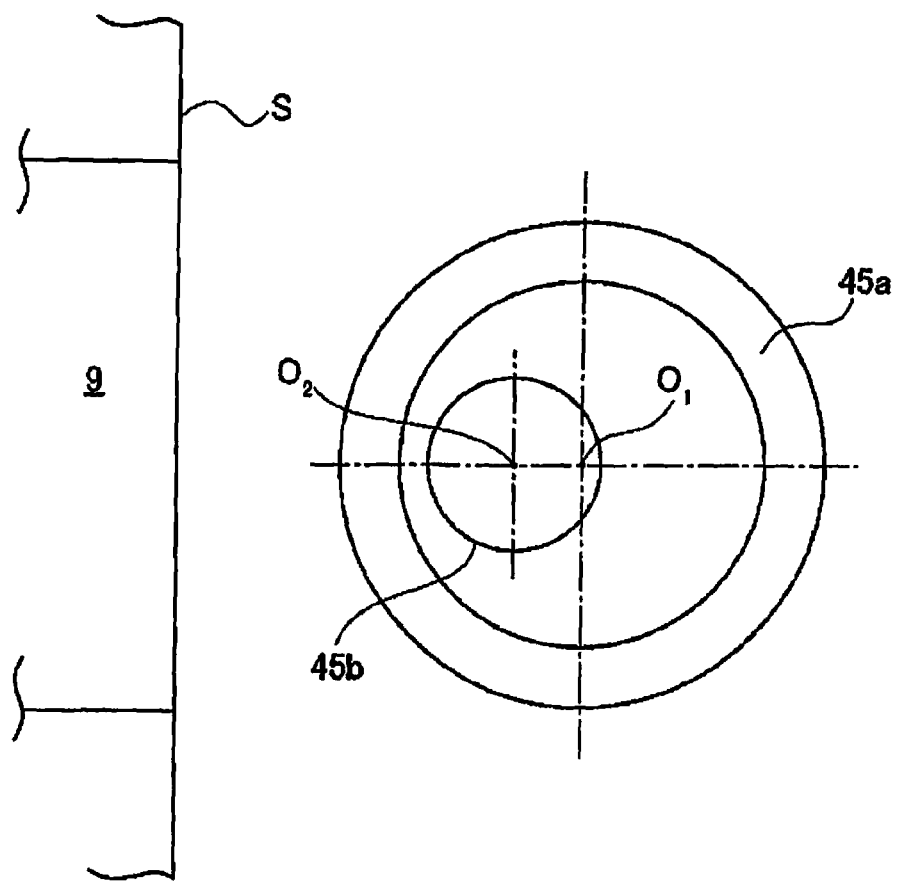
FIG. 6 is a sectional view showing an A-A section in FIG. 5.

FIG. 5 is a front view of an in-wheel motor driven wheel, when viewed from the front of the vehicle, to which a suspension device of a fourth embodiment is applied. FIG. 6 is a sectional view showing an A-A section in FIG. 5. Note that FIG. 5 shows a vehicle straight travelling state without wheels being steered. Further, the configuration similar to the first embodiment is attached with the same reference numeral and detailed explanation thereof will be omitted.

In the suspension device of the fourth embodiment, in the same manner as in the first embodiment, the wheel 1 is connected to the upper suspension arm 11 and the shock absorber 15 via the third link 43 (link member). Further, the third link 43 has an arm connecting portion 43a, a wheel supporting portion 43b, and a shock absorber connecting portion 43c. In addition, as shown in FIG. 5, the shock absorber connecting portion 43c is disposed in the vehicle lower position of the upper end surface 8a of the in-wheel motor unit 7.

Further, the lower end 45a of the shock absorber 45 is arranged between the vehicle body S and the vehicle body-side end surface 8b of the in-wheel motor unit 7', while being inclined so as to closer to the vehicle body S toward the lower end 45a, when viewed from the vehicle front.

Further, in the fourth embodiment, the shock absorber 45 has a coil spring 45a and a damper 45b with the damper 45b being arranged inside the coil spring 45a to be integrated to form a coilover type. In addition, as shown in FIG. 6, the axial position $O_1$ of the coil spring 45a is offset to the vehicle exterior side (outside in the vehicle-width or lateral direction) of the axial position $O_2$ of the damper 45b so as to be in a direction away from the vehicle body S.

Thus, by offsetting the axial position $O_1$ of the coil spring 45a to the vehicle outside (vehicle width direction outer side) than the axial position $O_2$ of the damper 45b disposed inside of the coil spring 45a, while preventing interference between the shock absorber 45 and the coil spring 45a which determines the maximum outer diameter of the body S, it is possible for the damper 45b to come close to the vehicle body S.

Figure 7:
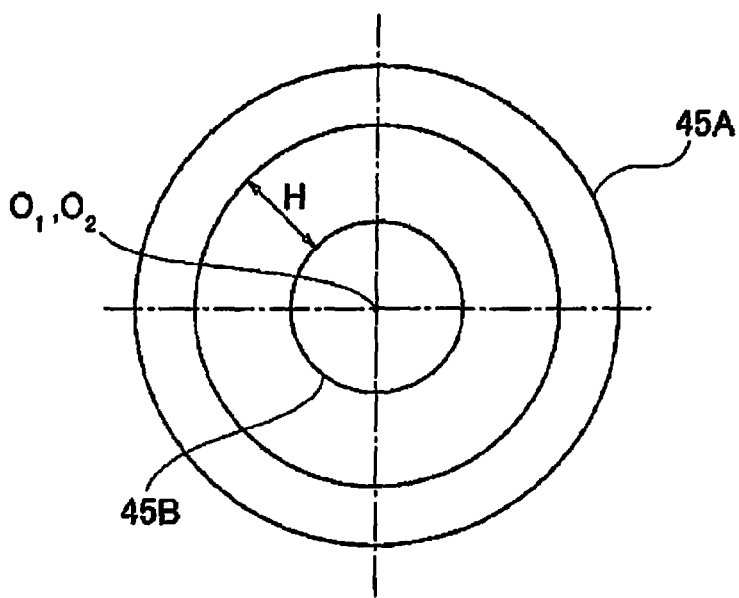
FIG. 7 is a cross-sectional view showing a principal part in a suspension device of Comparative Example.

In other words, since, in the shock absorber 45, the damper 45b is disposed inside of the coil spring 45a, the coil spring 45a is larger in the outer diameter of than the damper 45b. More specifically, as shown in FIG. 7, for example, when setting the axial position $O_1$ of the coil spring 45a and the axial position $O_2$ of the damper 45b coaxially, a gap H is created between the inside of the coil spring 45a and the damper 45b. When offsetting the axial position $O_1$ of the coil spring 45a by the amount of gap H in the direction of the vehicle outside, i.e., in the direction away from the vehicle body S, the damper 45b will be relatively closer to the vehicle body S.

Thus, it is possible to make the clearance between the lower end 45c of the damper 45b and the vehicle body S smaller so that the in-wheel motor unit 7 may be expanded in the axle direction in the fourth embodiment than in the first embodiment. Consequently, it is possible to secure a longer length of the in-wheel motor unit 7.

Now, a description of the technical effects is made. In the suspension device for an in-wheel motor driven wheel in the fourth embodiment, the following effects may be achieved.

(4) The shock absorber 45 includes a damper 45b and a coil spring 45a, wherein the damper 45b is disposed inside of the coil spring 45a, and the axial position $O_1$ of the coil spring 45b is offset in the vehicle exterior side than the axial position $O_2$ of the damper 45b.

Thus, even when the damper 45b is arranged in the inside of the coil spring 45a, it is possible to make the clearance between the lower end 45c of the damper 45b and the vehicle body S small and to secure a length of the in-wheel motor unit 7 in the axle direction.

In a fifth embodiment, the configuration and the layout of shock absorber is configured differently from the first and second embodiments.

Figure 8:
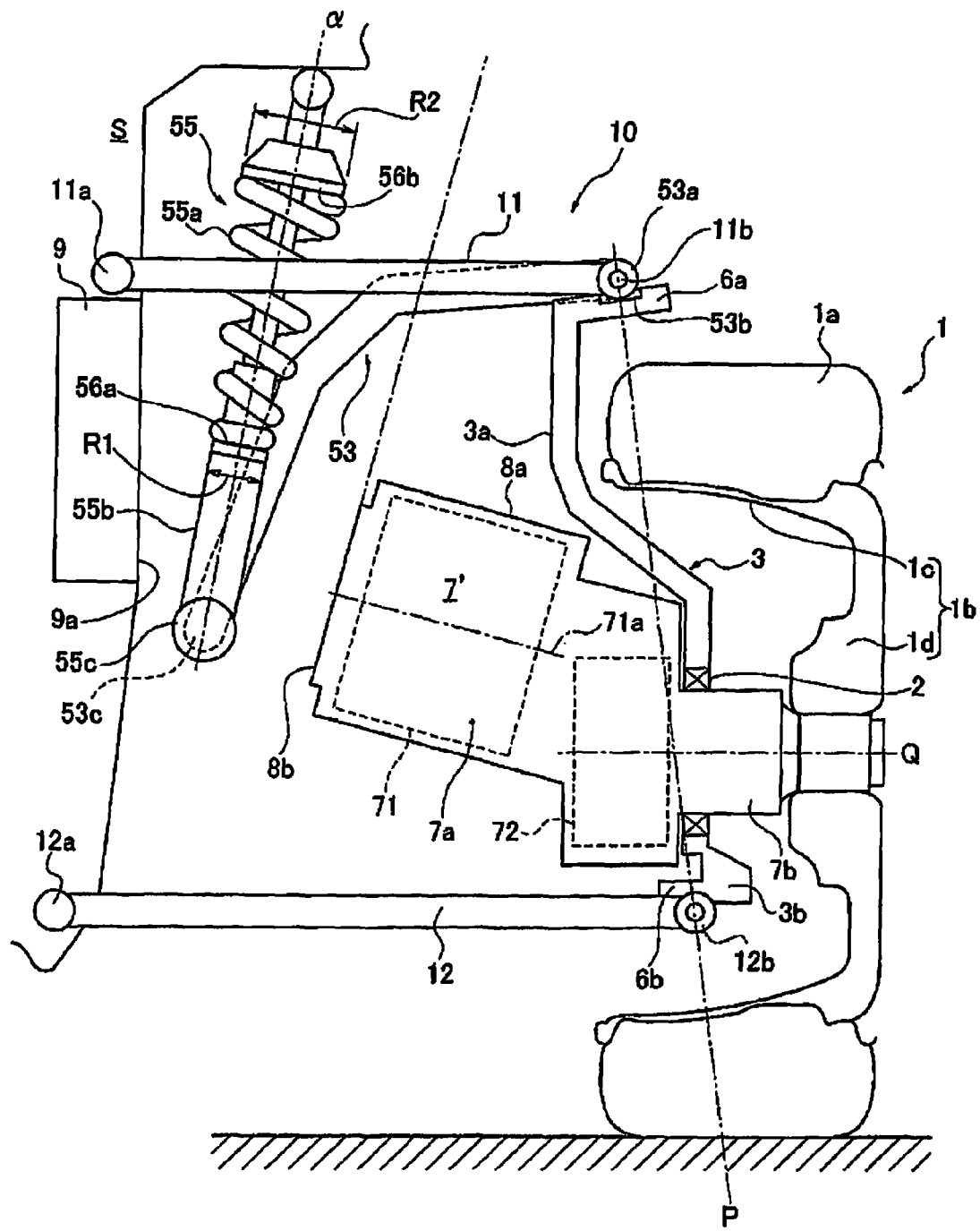
FIG. 8 is a front view of an in-wheel motor driven wheel, when viewed from the front of the vehicle, to which a suspension device of a fifth embodiment is applied.

FIG. 8 is a front view of an in-wheel motor driven wheel, when viewed from the front of the vehicle, to which a suspension device of a fourth embodiment is applied. FIG. 8 shows a vehicle straight travelling state without wheels being steered. Further, the configuration similar to the first or second embodiment is attached with the same reference numeral and detailed explanation thereof will be omitted.

In the suspension device in the fifth embodiment, similarly in the second embodiment, the in-wheel motor unit 7' has an electric motor 71 (rotating electrical machine) and a reduction gear 72 (transmission) accommodated in a unit case 7a. Further, a motor output shaft 71a of the electric motor 71 is connected to the axle Q of the wheel 1 in an inclined state. The vehicle body-side end surface 8b of the unit case 7a is inclined so as to be parallel to the axis direction α of the shock absorber.

In the suspension device of the fifth embodiment, in the same manner as in the first and second embodiments, the wheel 1 is connected to the upper suspension arm 11 and the shock absorber 15 via the third link 53 (link member). Further, the third link 53 has an arm connecting portion 53a, a wheel supporting portion 53b, and a shock absorber connecting portion 53c. In addition, as shown in FIG. 8, the shock absorber connecting portion 53c is disposed in the vehicle lower position of the upper end surface 8a (upper end) of the in-wheel motor unit 7.

Further, the lower end 45a of the shock absorber 55 is arranged between the vehicle body S and the vehicle body-side end surface 8b of the in-wheel motor unit 7', while being inclined so as to closer to the vehicle body S toward the lower end 55c, when viewed from the vehicle front.

Further, in the fifth embodiment, the shock absorber 55 has a coil spring 55a and a damper 55b with the damper 55b being arranged inside the coil spring 55a to be integrated to form a coilover type. In addition, as shown in FIG. 8, the coil spring 55a is set such that the outer diameter R1 of the coil bottom 56a disposed at the lower side is smaller than the outer diameter R2 of the coil top 56b disposed in the upper side. Thus, the outer diameter of the coil spring 55a increases gradually from the coil bottom 56a to the coil top 56b.

Further, the shock absorber 55 is disposed in the central position between the wheel-side surface 9a of the side member 9 and the vehicle body-side end surface 8b of the in-wheel motor unit 7'.

Here, "the wheel-side surface 9a of the side member 9" refers to a part of the side members 9 extending in the longitudinal direction of the vehicle, which faces the wheel 1, i.e., a side surface facing the vehicle side.

In addition, the "central position between the wheel-side surface 9a and the vehicle body-side end surface 8b of the in-wheel motor unit 7" refers to a position in which a distance from the wheel-side surface 9a and a distance from the vehicle body-side end surface 8b are equal. Here, whereas the wheel-side surface 9a extends along the vertical direction, the vehicle side surface 8b is inclined so as to be parallel to the axial direction α of the shock absorber. Thus, the central position will be inclined at the same angle as the axial direction α of the shock absorber with respect to a vertical direction. Further, when arranging the shock absorber 55 in the central position, the axial direction α of the shock absorber overlaps with the central position.

Moreover, by setting the outer diameter R1 of the coil bottom 56a of the coil spring 55a smaller than the outer diameter R2 of the coil top 56b, the lower end 55c of the shock absorber 55 that is inclined so as to come closer to the vehicle body S toward the lower end 55c may be set even closer to the vehicle body S.

In other words, when reducing the outer diameter R1 of the coil bottom 56a of the coil spring 55a, in the vicinity of the lower end 55c of the shock absorber 55 adjacent to the vehicle body S, the gap between the coil spring 55a and the vehicle body S may be set large. Therefore, by the increase amount of the gap, the shock absorber 55 may be shifted to the vehicle body S, and the length of the in-wheel motor unit 7 in the axle direction may be secured to be long. In particular, when the coil spring 55a overlaps with the in-wheel motor unit 7' in the vehicle vertical direction, it is possible to secure the length of the in-wheel motor unit 7' even longer.

Moreover, by placing the shock absorber 55 in the central position between the wheel-side surface 9a of the side member 9 and the vehicle body-side end surface 8b of the in-wheel motor unit 7', the distance between the side member 9 and the shock absorber 55 and the distance between the in-wheel motor unit 7' and the shock absorber 55 will be uniform over the entire length of the shock absorber 55.

Thus, it is possible to optimize the placement of the shock absorber of the so-called tapered spring type, in which the outer diameter R1 of the coil bottom 56a is smaller than the outer diameter of the coil top 56b.

Now, a description of the technical effects is made. In the suspension device for an in-wheel motor driven wheel in the fifth embodiment, the following effects may be achieved.

(5) The shock absorber 55 includes a damper 55b and a coil spring 55a, wherein the damper 55b is disposed inside the coil spring 55a, and the outer diameter R1 of the lower part of the coil spring 55a (coil bottom 56a) is set smaller than the outer diameter R2 of the upper part of the coil spring 55a (coil top 56b).

Thus, it is possible to widen the gap between the coil spring 55a and the vehicle body S in the vicinity of the lower part of the shock absorber 55. Thus, the shock absorber 55 may be displaced accordingly to the side of vehicle body S. In addition, it is possible to secure the length of the in-wheel motor unit 7' in the axial direction.

(6) The shock absorber 55 is configured to be placed in the central position between the wheel-side surface 9a of the side member 9 supporting the vehicle body S and the vehicle body-side end surface 8b of the in-wheel motor unit 7'.

Thus, the gap between the side member 9 and the shock absorber 55 is made uniform with the gap between the in-wheel motor unit 7' and the shock absorber 55. Therefore, it is possible to optimize the placement of the shock absorber 55 of the taper spring type.

Sixth Embodiment

In a sixth embodiment, the arrangement position of the shock absorber is configured differently from the first embodiment.

Figure 9:
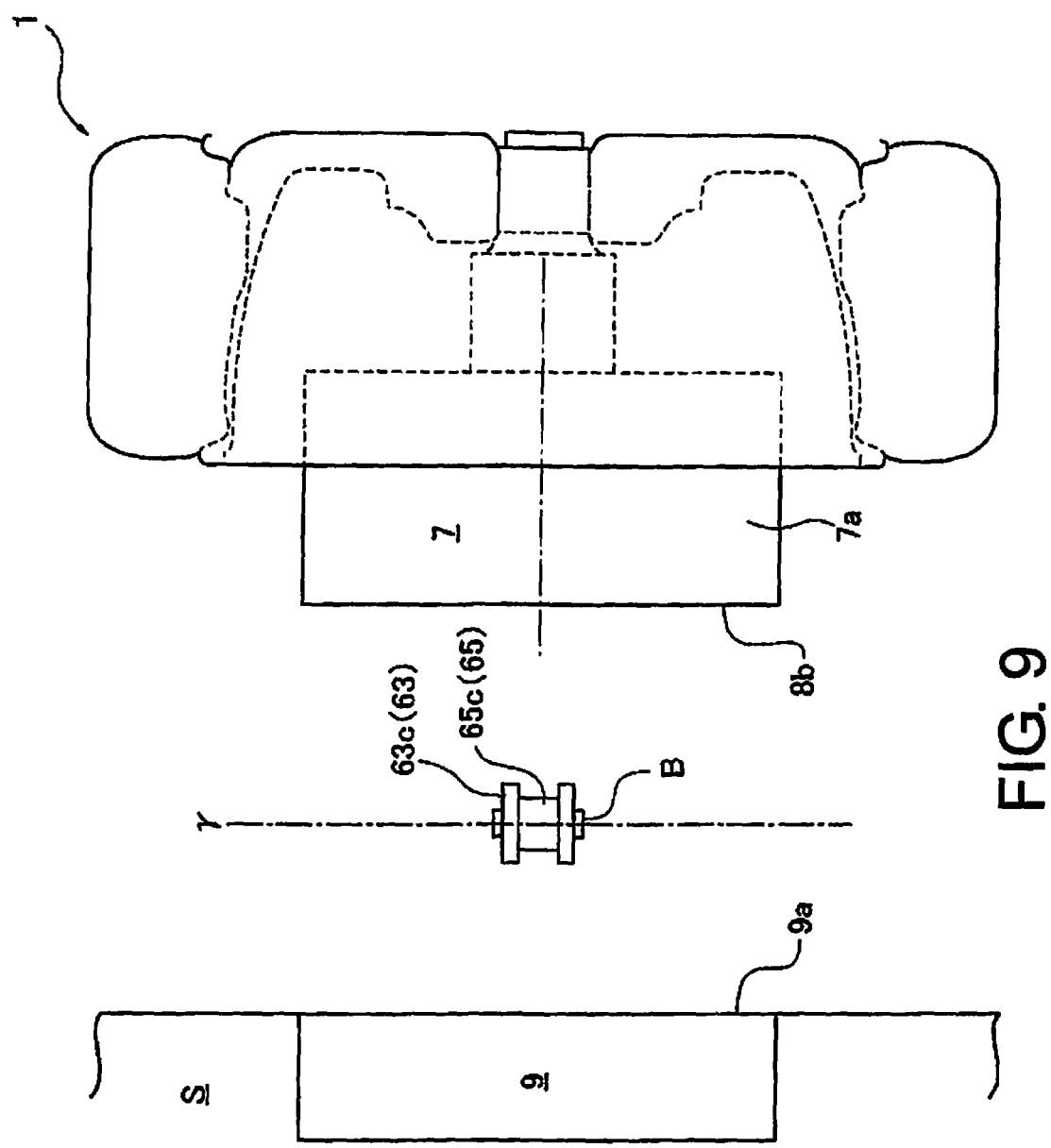
FIG. 9 is a plan view showing schematically the positions of the vehicle body, the in-wheel motor unit, and the shock absorber lower end in an in-wheel motor driven wheel to which the suspension device of a sixth embodiment is applied.

FIG. 9 is a plan view showing schematically the positions of the vehicle body, the in-wheel motor unit, and the shock absorber lower end for an in-wheel motor driven wheel to which the suspension device of a sixth embodiment is applied. Incidentally, FIG. 9 shows a straight traveling state where the wheels are not steered. Also, regarding the same structure as in the first and fifth embodiments, the same reference numeral is attached and detailed description thereof will be omitted.

In the suspension device of the sixth embodiment, in the same manner as in the first embodiment, the wheel 1 is connected to the upper suspension arm 11 (not shown) and the shock absorber 65 via a third link 63 (link member). Further, the third link 63 has an arm connecting portion (not shown), a wheel supporting portion (not shown), and a shock absorber connecting portion 63c.

In addition, the shock absorber connecting portion 63c is disposed in the vehicle bottom position lower than the upper end surface (not shown) of the in-wheel motor unit 7 so that the shock absorber connecting portion 63c overlaps with the in-wheel motor unit 7 in the vertical direction of the vehicle. Further, the lower end 65c of the shock absorber 65 is connected to the shock absorber connecting portion 63c to be rotatable in the vehicle vertical direction. More specifically, a bolt B penetrates through the shock absorber connecting portion 63c and the lower end 65c of the shock absorber 65. Thus, the shock absorber connecting portion 63c and the shock absorber 65 are relatively rotatable about the bolt B.

Further, in the sixth embodiment, when the wheel 1 is in the straight travelling state, the direction γ of the rotating axis of the shock absorber 65 representing the axial direction of the bolt B, the wheel-side surface 9a of the side member 9 supporting the vehicle body S, and the vehicle body-side end surface 8b of the in-wheel motor unit 7 are set to be parallel to each other.

Here, "when the wheel 1 is in the straight travelling state" refers to the state in which the steering angle of the wheel is zero, i.e. wheels are not steered. In this instance, the vehicle body-side end surface 8b of the in-wheel motor unit 7 is directly opposite to the vehicle body S, and the vehicle body-side end surface 8b and the wheel side surface 9a of the side member 9 are parallel. In this state, in the sixth embodiment, the direction γ of the rotating axis of the shock absorber 65 is also set to be parallel to the vehicle body-side end surface 8b and the wheel-side surface 9a of the side member 9.

Thus, it is possible to compactly arrange the lower end 65c of the shock absorber 65 between the shock absorber connecting portion 63c of the third link 63 and the vehicle body-side end surface 8b of the in-wheel motor unit 7. Consequently, it is possible to expand the length of the in-wheel motor unit 7 in the axle direction thereof.

Now, a description of the effects is given. In the suspension device for an in-wheel motor driven wheel of the sixth embodiment, it is possible to obtain the effect below.

(7) The shock absorber connecting portion 63c is connected to the lower end 65c of the shock absorber 65 to be rotatable in the vertical direction, wherein, when the wheel 1 is in the straight travelling state, the direction γ of the rotation axis of the shock absorber 65, the wheel-side surface 9a of the side member 9 supporting the vehicle body S, and the vehicle body-side end surface 8b of the in-wheel motor unit 7 are configured to be parallel to each other. Thus, it is possible to compactly arrange the lower end 65c of the shock absorber 65 between the third link 63 and the in-wheel motor unit 7 to thereby expand the length of the in-wheel motor unit 7 in the axle direction.

Seventh Embodiment

In a seventh embodiment, the arrangement position of the shock absorber is configured differently from the sixth embodiment.

Figure 10:
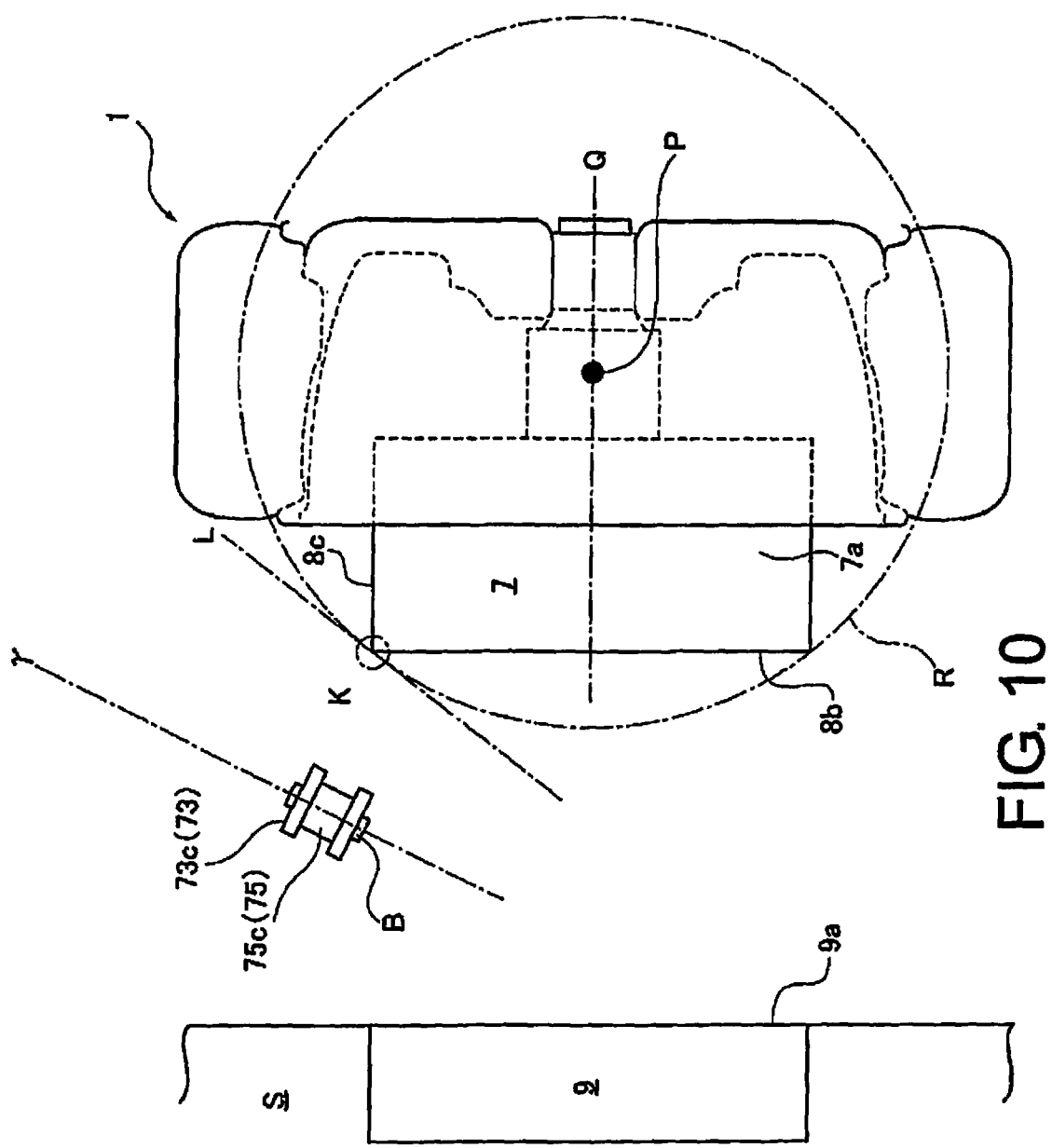
FIG. 10 is a plan view showing schematically the positions of the vehicle body, the in-wheel motor unit, and the shock absorber lower end in an in-wheel motor driven wheel to which the suspension device of a seventh embodiment is applied.

FIG. 10 is a plan view showing schematically the positions of the vehicle body, the in-wheel motor unit, and the shock absorber lower end for an in-wheel motor driven wheel to which the suspension device of a seventh embodiment is applied. Note that FIG. 10 shows a straight traveling state where the wheels are not steered. Also, regarding the same structure as in the first or sixth embodiment, the same reference numeral is attached, and a detailed description thereof will be omitted.

In the suspension device of the seventh embodiment, in the same manner as in the first embodiment, the wheel 1 is connected to the upper suspension arm 11 (not shown) and the shock absorber 75 via a third link 73 (link member). Further, the third link 73 has an arm connecting portion (not shown), a wheel supporting portion (not shown), and a shock absorber connecting portion 73c.

In addition, the shock absorber connecting portion 73c is disposed in the vehicle bottom position lower than the upper end surface (not shown) of the in-wheel motor unit 7 so that the shock absorber connecting portion 73c overlaps with the in-wheel motor unit 7 in the vehicle vertical direction. Further, the lower end 75c of the shock absorber 75 is connected to the shock absorber connecting portion 73c to be rotatable in the vehicle vertical direction. More specifically, a bolt B penetrates through the shock absorber connecting portion 73c and the lower end 75c of the shock absorber 65. Thus, the shock absorber connecting portion 73c and the shock absorber 75 are relatively rotatable about the bolt B.

Further, in the seventh embodiment, the shock absorber connecting portion 73c if offset in the vehicle rearward with respect to the axle Q of the wheel 1. In other words, the shock absorber connecting portion 73c, when viewed in plan, is arranged in a rear position of the vehicle than the axle Q. In addition, when the wheels 1 is in straight travelling or running state, the rotation axis direction γ of the shock absorber 75, i.e., an axial direction of the bolt B is inclined with respect to the wheel-side surface 9a of the side member 9 and the vehicle body-side end surface 8b of the in-wheel motor unit 7.

That is, "when the wheel 1 is in the straight travelling state", as described in the sixth embodiment, the vehicle body-side end surface 8b and the wheel-side surface 9a of the side member 9 are parallel to each other. Then, in this state, in the seventh embodiment, the direction γ of the rotating axis of the shock absorber 75 is set substantially parallel to the tangential line L of a circle R shown in FIG. 10. Note that "the circle R shown in FIG. 10," refers to a circle centered at the kingpin axis P and with a radius corresponding to a distance between the kingpin axis P and a corner K formed by vehicle body-side end surface 8b of the in-wheel motor unit 7 and a rear end surface 8c facing the vehicle rearward. In addition, the "tangential L" is the tangent of the circle R at the corner K that is formed between the vehicle body-side end surface 8b and the rear end surface 8c.

Thus, it is possible to compactly arrange the lower end 75c of the shock absorber 75 between the shock absorber connecting portion 73c of the third link 73 and the vehicle body-side end surface 8b of the in-wheel motor unit 7. Consequently, it is possible to expand the length of the in-wheel motor unit 7 in the axle direction thereof.

Now, a description of the effects is given. In the suspension device for an in-wheel motor driven wheel of the seventh embodiment, it is possible to obtain the effect below.

(8) The shock absorber connecting portion 73c is configured to be connected to the lower end 75c of the shock absorber 75 rotatably in the vertical direction and offset from the axle Q in the vehicle rearward position. Further, when the wheel is in a straight travelling state, the direction γ of the rotating axis of the shock absorber 75 is configured to be inclined with respect to the wheel-side surface 9a of the side member 9 supporting the vehicle body S and the vehicle-side end surface 8b of the in-wheel motor unit 7. Thus, it is possible to compactly place the lower end 75c of the shock absorber 75 between the side member 9 and the in-wheel motor unit 7 to thereby expand the length of the in-wheel motor unit 7 in the axle direction.

As described above, the suspension device for an in-wheel motor driven wheel has been explained with reference to the first to seventh embodiments. However, the specific configurations may not be limited to the embodiments. Without departing from the gist of the inventions pertaining to each claim, change in the design and the change or addition of the design may be allowed.

The suspension device in each of the embodiments described above is applied to a front steering wheel. However, the configuration is not limited thereto. Rather, the present invention is applicable to a driving wheel disposed on the rear side of the vehicle body S. Here, in the in-wheel motor driven wheel for rear-wheel drive vehicle, when setting the lower end of the shock absorber to a high position away from the road surface, the top end of the shock absorber protrudes correspondingly in a cargo space formed in the rear of the vehicle so that the cargo space will be narrower. In contrast, by applying the suspension device according to the present invention, while preventing the protrusion of the shock absorber to the cargo space due to setting of the upper end of the shock absorber at a higher position, the length of the in-wheel motor unit in the axle direction can be ensured.

Further, in the seventh embodiment, an example is shown in which, in addition to offsetting the shock absorber connecting portion 73c in the vehicle rearward position with respect to the axle Q, the direction γ of the shock absorber rotating axis is inclined with respect to the wheel-side surface 9a and the vehicle body-side end surface 8c. However, the configuration is not limited thereto. Instead, in a state in which the shock absorber connecting portion 73c is offset in the vehicle forward position with respect to the axle Q, the direction γ of the shock absorber rotating axis may be inclined with respect to the wheel-side surface 9a and the vehicle body-side end surface 8c.

Further, in each embodiment described above, the in-wheel motor unit 7, 7' is configured to accommodate integrally the electric motor 71 and the reduction gear 72 (transmission). However, the electric motor and the reduction gear (transmission) may be separate.

The invention claimed is:

1. A suspension device for an in-wheel motor driven wheel in which a wheel driven by an in-wheel motor unit is suspended on a vehicle body by a suspension structure member and a shock absorber, the suspension structure member comprising:
   an upper suspension arm pivotally supported on the vehicle body for supporting the wheel in a vehicle upper position higher than an axle, and
   a link member pivotally connecting the wheel to the upper suspension arm and having a shock absorber connecting portion connected to a lower end of the shock absorber and a wheel supporting portion connected to a knuckle, the shock absorber connecting portion being disposed in the vehicle bottom position lower than an upper end portion of the in-wheel motor unit, and the shock absorber being disposed between the vehicle body and the in-wheel motor unit and inclined so as to be closer to the vehicle body toward the lower end of the shock absorber, and the wheel supporting portion being supported on the knuckle such that the link member and the knuckle are rotatable about a kingpin axis.

2. The suspension device for the in-wheel motor driven wheel as claimed in claim 1, wherein
   the in-wheel motor unit has a rotating electrical machine, and the output shaft of the rotating electrical machine is inclined with respect to the axle of the wheel, and a vehicle body-side end surface of the in-wheel motor unit is inclined so as to be parallel to the axial direction of the shock absorber.

3. The suspension device for the in-wheel motor driven wheel as claimed in claim 1, wherein
   the shock absorber includes a damper and a coil spring, the damper is disposed inside of the coil spring, and the axial position of the coil spring is more offset in the vehicle exterior side than the axial position of the damper.

4. The suspension device for the in-wheel motor driven wheel as claimed in claim 1, wherein
   the shock absorber includes a damper and a coil spring, the damper is disposed inside the coil spring, and an outer diameter of the lower part of the coil spring is smaller than an outer diameter of the upper part of the coil spring.

5. The suspension device for the in-wheel motor driven wheel as claimed in claim 4, wherein
   the shock absorber is disposed in a central position between a wheel-side surface of the side member supporting the vehicle body and a vehicle body-side end surface of the in-wheel motor unit.

6. The suspension device for the in-wheel motor driven wheel as claimed in claim 1, wherein
   the shock absorber includes a damper and a coil spring, the damper is disposed outside of the coil spring and between the vehicle body and the shock absorber connecting portion, and the coil spring is disposed between the vehicle body and the link member.

7. The suspension device for the in-wheel motor driven wheel as claimed in claim 1, wherein
   the shock absorber connecting portion is connected to the lower end of the shock absorber to be rotatable in the vertical direction, and, when the wheel is in a straight travelling state, the direction of the rotation axis of the shock absorber, a wheel-side surface of the side member supporting the vehicle body, and a vehicle body-side end surface of the in-wheel motor unit are parallel to each other.

8. The suspension device for the in-wheel motor driven wheel as claimed in claim 1, wherein
the shock absorber connecting portion is connected to the lower end of the shock absorber to be rotatable in the vertical direction and offset from the axle in either rearward or forward position of the vehicle, and, when the wheel is in a straight travelling state, the direction of the rotating axis of the shock absorber is inclined with respect to a wheel-side surface of the side member supporting the vehicle body and a vehicle-side end surface of the in-wheel motor unit.

9. The suspension device for the in-wheel motor driven wheel as claimed in claim 2, wherein
the shock absorber includes a damper and a coil spring, the damper is disposed inside of the coil spring, and the axial position of the coil spring is more offset in the vehicle exterior side than the axial position of the damper.

10. The suspension device for the in-wheel motor driven wheel as claimed in claim 2, wherein
the shock absorber includes a damper and a coil spring, the damper is disposed inside the coil spring, and an outer diameter of the lower part of the coil spring is smaller than an outer diameter of the upper part of the coil spring.

11. The suspension device for the in-wheel motor driven wheel as claimed in claim 3, wherein
the shock absorber includes the damper and the coil spring, the damper is disposed inside the coil spring, and an outer diameter of the lower part of the coil spring is smaller than an outer diameter of the upper part of the coil spring.

12. The suspension device for the in-wheel motor driven wheel as claimed in claim 2, wherein
the shock absorber includes a damper and a coil spring, the damper is disposed outside of the coil spring and between the vehicle body and the shock absorber connecting portion, and the coil spring is disposed between the vehicle body and the link member.

13. The suspension device for the in-wheel motor driven wheel as claimed in claim 2, wherein
the shock absorber connecting portion is connected to the lower end of the shock absorber to be rotatable in the vertical direction, and, when the wheel is in a straight travelling state, the direction of the rotation axis of the shock absorber, a wheel-side surface of the side member supporting the vehicle body, and the vehicle body-side end surface of the in-wheel motor unit are parallel to each other.

14. The suspension device for the in-wheel motor driven wheel as claimed in claim 3, wherein
the shock absorber connecting portion is connected to the lower end of the shock absorber to be rotatable in the vertical direction, and, when the wheel is in a straight travelling state, the direction of the rotation axis of the shock absorber, a wheel-side surface of the side member supporting the vehicle body, and a vehicle body-side end surface of the in-wheel motor unit are parallel to each other.

15. The suspension device for the in-wheel motor driven wheel as claimed in claim 4, wherein
the shock absorber connecting portion is connected to the lower end of the shock absorber to be rotatable in the vertical direction, and, when the wheel is in a straight travelling state, the direction of the rotation axis of the shock absorber, a wheel-side surface of the side member supporting the vehicle body, and a vehicle body-side end surface of the in-wheel motor unit are parallel to each other.

16. The suspension device for the in-wheel motor driven wheel as claimed in claim 5, wherein
the shock absorber connecting portion is connected to the lower end of the shock absorber to be rotatable in the vertical direction, and, when the wheel is in a straight travelling state, the direction of the rotation axis of the shock absorber, a wheel-side surface of the side member supporting the vehicle body, and a vehicle body-side end surface of the in-wheel motor unit are parallel to each other.

17. The suspension device for the in-wheel motor driven wheel as claimed in claim 6, wherein
the shock absorber connecting portion is connected to the lower end of the shock absorber to be rotatable in the vertical direction, and, when the wheel is in a straight travelling state, the direction of the rotation axis of the shock absorber, a wheel-side surface of the side member supporting the vehicle body, and a vehicle body-side end surface of the in-wheel motor unit are parallel to each other.

18. The suspension device for the in-wheel motor driven wheel as claimed in claim 2, wherein
the shock absorber connecting portion is connected to the lower end of the shock absorber to be rotatable in the vertical direction and offset from the axle in either rearward or forward position of the vehicle, and, when the wheel is in a straight travelling state, the direction of the rotating axis of the shock absorber is inclined with respect to a wheel-side surface of the side member supporting the vehicle body and the vehicle-side end surface of the in-wheel motor unit.

19. The suspension device for the in-wheel motor driven wheel as claimed in claim 3, wherein
the shock absorber connecting portion is connected to the lower end of the shock absorber to be rotatable in the vertical direction and offset from the axle in either rearward or forward position of the vehicle, and, when the wheel is in a straight travelling state, the direction of the rotating axis of the shock absorber is inclined with respect to a wheel-side surface of the side member supporting the vehicle body and a vehicle-side end surface of the in-wheel motor unit.

20. The suspension device for the in-wheel motor driven wheel as claimed in claim 4, wherein
the shock absorber connecting portion is connected to the lower end of the shock absorber to be rotatable in the vertical direction and offset from the axle in either rearward or forward position of the vehicle, and, when the wheel is in a straight travelling state, the direction of the rotating axis of the shock absorber is inclined with respect to a wheel-side surface of the side member supporting the vehicle body and a vehicle-side end surface of the in-wheel motor unit.

* * * * *